(12) United States Patent
Huang et al.

(10) Patent No.: US 7,220,391 B1
(45) Date of Patent: May 22, 2007

(54) UV PHOTOCHEMICAL OPTION FOR CLOSED CYCLE DECOMPOSITION OF HYDROGEN SULFIDE

(75) Inventors: Cunping Huang, Cocoa, FL (US); Clovis A. Linkous, Merritt Island, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 10/165,843

(22) Filed: Jun. 7, 2002

Related U.S. Application Data

(60) Continuation-in-part of application No. 09/784,393, filed on Feb. 15, 2001, now Pat. No. 6,572,829, which is a division of application No. 09/375,967, filed on Aug. 17, 1999, now Pat. No. 6,248,218.

(60) Provisional application No. 60/126,036, filed on Mar. 25, 1999.

(51) Int. Cl.
*B01J 19/08* (2006.01)

(52) U.S. Cl. ............... 422/186.03; 204/157.49; 204/157.52

(58) Field of Classification Search ........... 422/186.03; 204/157.49, 157.52
See application file for complete search history.

(56) References Cited

U.S. PATENT DOCUMENTS

| | | | |
|---|---|---|---|
| 3,781,194 A | 12/1973 | Juillet et al. | 204/162 |
| 3,933,608 A | 1/1976 | Haas et al. | 204/164 |
| 4,210,503 A | 7/1980 | Confer | 204/158 |
| 4,390,515 A | 6/1983 | Vincent | 423/573 |
| 4,401,553 A | 8/1983 | Faudel | 208/11 |
| 4,405,424 A * | 9/1983 | Graetzel et al. | 204/157.49 |
| 4,602,988 A | 7/1986 | Kolts | 204/157.52 |
| 4,610,766 A * | 9/1986 | Kolts et al. | 204/157.52 |
| 4,769,504 A | 9/1988 | Noceti et al. | 204/157.6 |
| 4,917,784 A | 4/1990 | Shelnutt | 204/157.6 |
| 5,019,652 A | 5/1991 | Taylor et al. | 562/549 |

(Continued)

OTHER PUBLICATIONS

C. Linkous, Photocatalytic Production of Hydrogen from Hydrogen Sulfide using Semiconductor Particulates:, Hydrogen Energ Progress X, Proc. World Hydrogen Energy Conf., 10$^{th}$, vol. 2, pp. 755-762, 1994.*

(Continued)

*Primary Examiner*—Kishor Mayekar
(74) *Attorney, Agent, or Firm*—Brian S. Steinberger; Phyllis K. Wood; Law Offices of Brian S. Steinberger, P.A.

(57) ABSTRACT

Methods and systems for separating hydrogen and sulfur from hydrogen sulfide($H_2S$) gas. Hydrogen sulfide($H_2S$) gas is passed into a scrubber and filtration unit with polysulfide solution. Interaction frees elemental sulfur which is filtered, excess continues to a stripper unit where the excess $H_2S$ is removed. The excess $H_2S$ returns to the scrubber and filtration unit, while the sulfide solution passes into a photoreactor containing a photocatalyst and a light source. The sulfide solution is oxidatively converted to elemental sulfur and complexed with excess sulfide ion to make polysulfide ion, while water is reduced to hydrogen. Hydrogen is released, while the polysulfide solution is fed back to the scrubber unit where the system operation repeats. In a second embodiment, the photocatalyst is eliminated, and the hydrogen sulfide solution is directly illuminated with ultraviolet radiation with a light source such as a low pressure mercury lamp operating at approximately 254 nm.

11 Claims, 5 Drawing Sheets

U.S. PATENT DOCUMENTS

| | | | |
|---|---|---|---|
| 5,104,504 A | 4/1992 | Tanaka et al. | 204/157.9 |
| 5,211,923 A | 5/1993 | Harkness et al. | 423/220 |
| 5,262,023 A | 11/1993 | Sayama et al. | 204/157.5 |
| 5,480,524 A | 1/1996 | Oeste | 204/158.2 |
| 5,689,798 A | 11/1997 | Oeste | 422/186.3 |
| 5,720,858 A | 2/1998 | Noceti et al. | 204/157.6 |
| 5,862,449 A | 1/1999 | Bischoff et al. | 422/186.3 |
| 6,063,258 A | 5/2000 | Sayama et al. | 205/637 |
| 6,248,218 B1 | 6/2001 | Linkous et al. | 204/157.49 |

OTHER PUBLICATIONS

Niklaus Buhler. et al., "*Photochemical Hydrogen Production with Cadmium Suspensions,*" Aug. 22, 1983, pp. 3261-3268.

A. Ueno, et al., "*Silica-Supported ZnS-CdS Mixed Semiconductor Catalysts For Photogeneration of Hydrogen,*" Feb. 26, 1985, pp. 3828-3833.

E. N. Savinov, et al., "*Suspensions of Semiconductors With Microheterojunctions- A New Type of Highly Efficient Photocatalyst For Dihydrogen Production From Solution of Hydrogen Sulfide and Sulfide Ions,*" vol. 14, No. 1, pp. 1-9, 1989.

Shuben Li, et al., "*Hydrogen Production by H2S Photocatalytic Decomposition,*" vol. 16, pp. 517-519. Jul. 18, 1991.

Nazim Muradov, et al., "*Selective Photocatalytic Destruction of Airbourne Vocs,*" vol. 56, No. 5, pp. 445-453, 1996.

Theodore F. Schoenborn, "*The RIB-IT Views,*" pp. 254-259, 1996-1997.

Clovis Linkous, "*Photocatalytic Recycling of H2 in Hydrodesulfurization,*" pp. 101-104, Mar. 29-Apr. 3, 1998.

K. Hara, et al., "*UV Phoroinduced Reduction of Water to Hydrogen In Na2S, Na2SO3, and Na2S2O Aqueous Solutions,*" pp. 27-31, Jul. 14, 1999.

\* cited by examiner

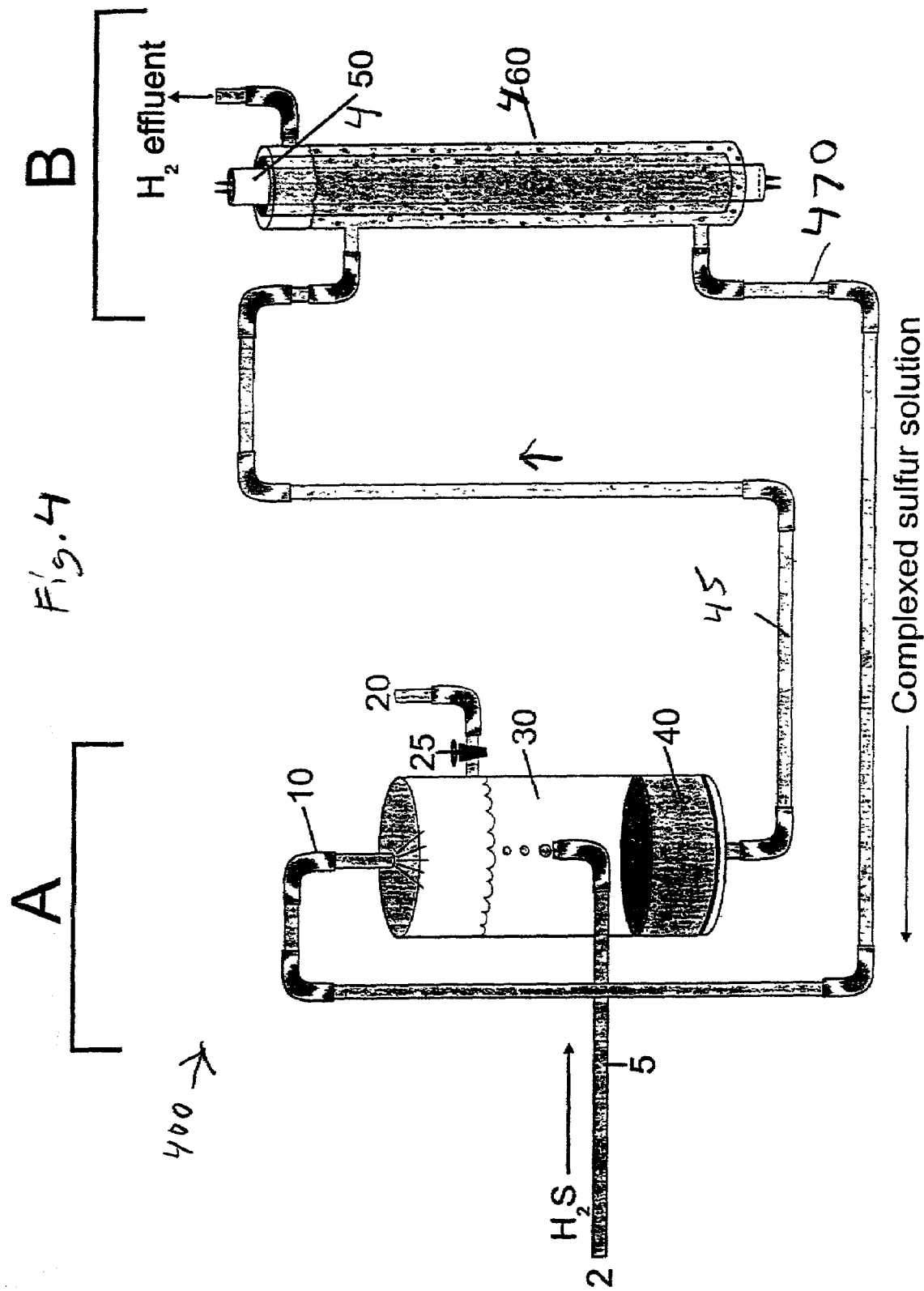

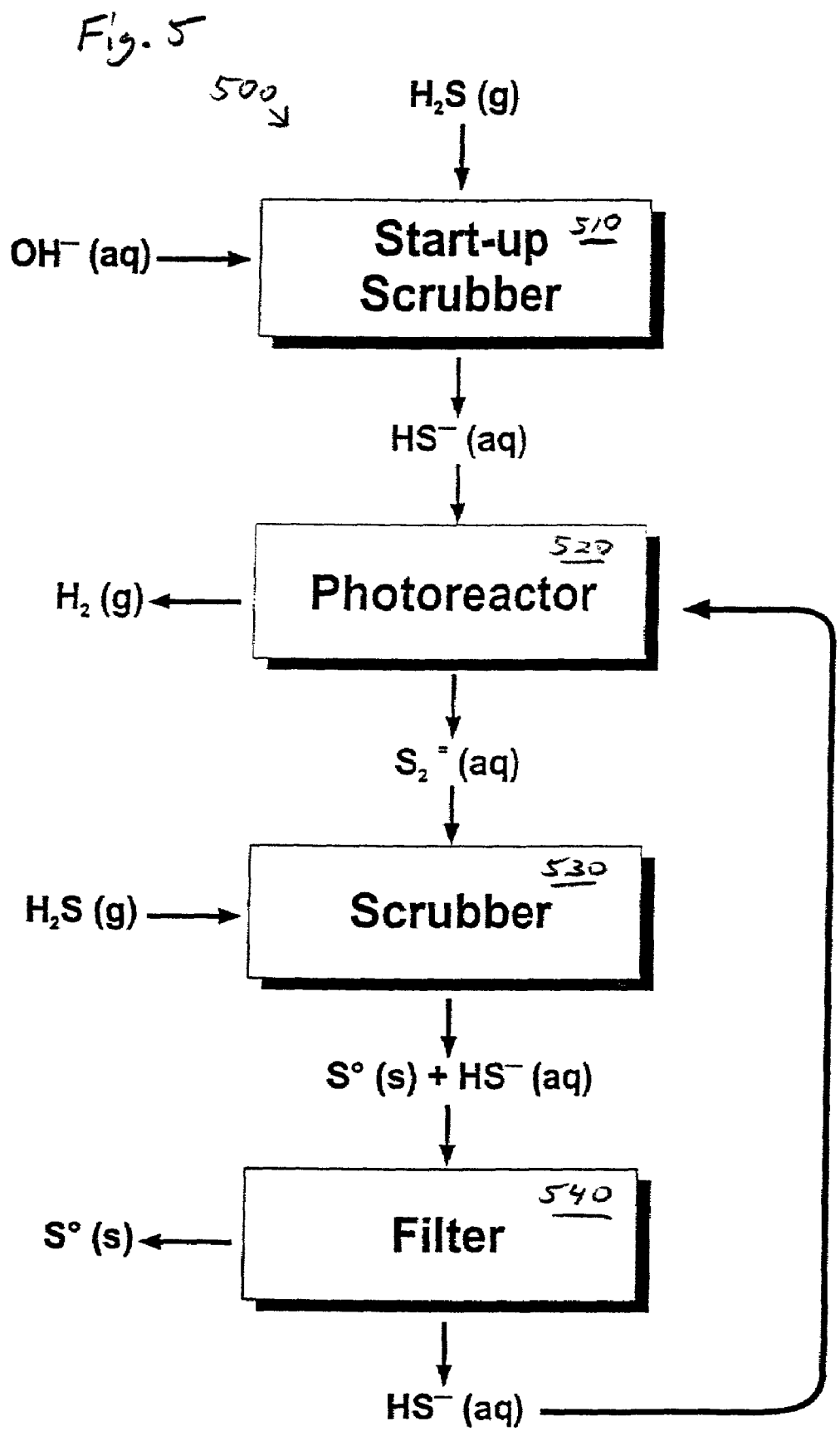

UV PHOTOCHEMICAL OPTION FOR CLOSED CYCLE DECOMPOSITION OF HYDROGEN SULFIDE

This invention relates to sulfur recovery from oil and gas refinery waste streams, and in particular to a method and apparatus for a closed cycle system for the decomposition of hydrogen sulfide using an ultraviolet source to directly illuminate an alkaline sulfide solution to yield both sulfur and hydrogen which can be later sold or used internally at a refinery and is a Continuation-In-Part of U.S. application Ser. No. 09/784,393 filed Feb. 15, 2001 now U.S. Pat. No. 6,572,829, which is a Divisional application of Ser. No. 09/375,967 filed Aug. 17, 1999, now U.S. Pat. No. 6,248,218, which claims the benefit of priority of U.S. Provisional Application 60/126,036 filed on Mar. 25, 1999, by the same assignees.

BACKGROUND AND PRIOR ART

Oil refineries typically process crude oil from the ground which contains unusable organic sulfur, the latter of which must be separated from the crude oil in order to allow the oil to become a useful product. Typically, the crude oil is treated with hydrogen and a catalyst under a high temperature which decomposes the organic sulfur compounds in the crude oil and releases the sulfur in the form of hydrogen sulfide($H_2S$) gas. The problem is what do the refineries do with the $H_2S$ gas, which is a noxious poisonous gas that cannot be released into the atmosphere.

Recent environmental regulations generally require oil and gas refineries to develop waste minimization technologies for the treatment of sulfur-containing compounds, such as hydrogen sulfide($H_2S$) within their facilities. Current technology typically requires a solvent absorption and stripping process to separate the acid gases, a Claus-type reactor to perform a partial oxidation of the sulfide to make elemental sulfur and water and a tertiary gas treatment, the latter of which having specifics that can vary greatly but must effect at least another hundred-fold reduction in $H_2S$ concentration.

Currently refineries must now go out and buy or make hydrogen to perform hydrodesulfurization. Afterwards, the resultant $H_2S$ must then be decomposed at the plant.

As the world supply of petroleum decreases, the average sulfur content of crude oil has begun to rise. In recent years the average oil refinery has gone from being a net producer to a net consumer of $H_2$. The oil producers would thus be interested in any process that increases the amount of $H_2$ available in-house.

SUMMARY OF THE INVENTION

A primary objective of the present invention is to provide a method and apparatus of recovering sulfur from oil and gas refinery waste streams in a closed loop system without using photocatalysts, wherein a hydrogen sulfide($H_2S$) solution is illuminated with ultraviolet radiation to yield both sulfur and hydrogen.

A secondary objective of the present invention is to decompose noxious poisonous gas such as hydrogen sulfide into separate amounts of hydrogen and sulfur using ultraviolet light.

A third objective is to recoup the $H_2$ contained in $H_2S$ and return it to the hydrodesulfurization plant for reuse in oil refinery applications.

A fourth objective of this invention is recover sulfur from oil and gas refinery waste streams, and to decompose noxious poisonous gasses such as hydrogen sulfide, without using a photocatalyst.

A fifth objective of this invention is recover sulfur from oil and gas refinery waste streams, and to decompose noxious poisonous gasses such as hydrogen sulfide, using inexpensive lamp sources such as low pressure mercury lamps.

A sixth objective of this invention is recover sulfur from oil and gas refinery waste streams, and to decompose noxious poisonous gasses such as hydrogen sulfide, without having to adjust pH levels.

A first preferred embodiment of the novel process decomposes $H_2S$ in a thermodynamically uphill process to its constituent elements:

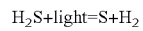
$$H_2S + light = S + H_2$$

The energy to drive the reaction can either come from the sun or an artificial light source. The decomposition process is photoelectrochemical in nature, in which the photovoltaic effect from semiconductor solid state physics is combined with conventional electrochemical principles to produce a light-driven electrochemical reactor using semiconductor electrodes. Thus, we call it the PEP(photoelectrochemical particle) process.

In a first preferred embodiment from the parent patent applications, $H_2S$ from the stripper is passed into an alkaline solution to produce bisulfide ion, $HS^-$ (aq). The sulfide solution is then sent into a photoreactor, which consists of a bed of catalyst-activated semiconductor particles such as Cadmium Sulfide(CdS), distributed in a thin, planar or cylindrical array depending on the lamp configuration, and a light source containing a wavelength range of approximately 450 to approximately 500 nm. As the solution is passed over the surface of the photo-energized semiconductor particles, bisulfide ion is oxidized and water is reduced to sulfur and hydrogen, respectively. Other photo-catalysts useful can include as Platinized Cadmium Sulfide, Pt—CdS, Zinc Sulfide, ZnS, Zinc Ferrate, $ZnFe_2O_4$, and Indium Sulfide, $In_2S_3$ The exit stream from the photoreactor will contain sulfur in the form of polysulfide ion, which results when sulfur is produced in the presence of excess bisulfide ion:

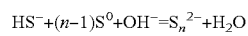
$$HS^- + (n-1)S^0 + OH^- = S_n^{2-} + H_2O$$

The polysulfide solution is returned to the scrubber tank, where pressurizing with $H_2S$ causes the sulfur to become separated from solution.

The following chemical process shows the effects of combining sulfur recovery and scrubber units, utilizing the acid properties of $H_2S$ itself to decompose polysulfide ions and free the elemental sulfur.

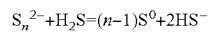
$$S_n^{2-} + H_2S = (n-1)S^0 + 2HS^-$$

The first preferred embodiment can use sunlight and/or artificially created ultraviolet light.

In a second preferred embodiment, the final stage of the first preferred embodiment is eliminated, so that an ultraviolet source emitting at approximately 254 nm from a low-pressure mercury lamp illuminates the alkaline sulfide solution alone with no photo catalyst, instead of using a photocatalyst and a reactor that is subjected to a visible wavelength at approximately 450 to approximately 500 nm. The second embodiment does not use sunlight but must use some type of artificially created ultraviolet light.

Further objects and advantages of this invention will be apparent from the following detailed description of a presently preferred embodiments which is illustrated schematically in the accompanying drawings.

BRIEF DESCRIPTION OF THE FIGURES

FIG. 4 is a layout of a second preferred embodiment of a closed cycle process shown in the first preferred embodiment without a photocatalyst.

FIG. 5 is a flowchart of the chemical formula reaction occurring in the layout of FIG. 4.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

First Preferred Embodiment

Figure 1:
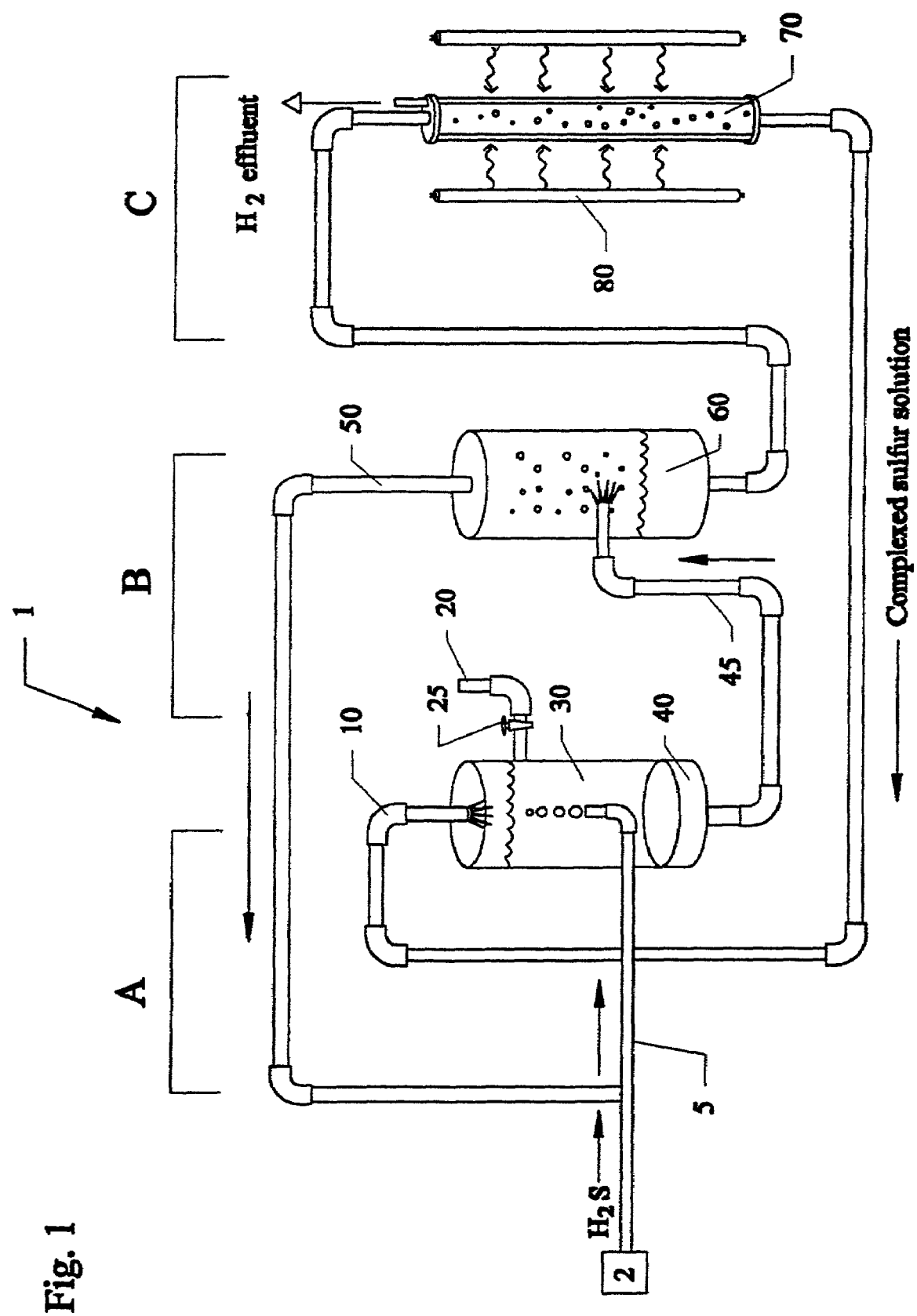
FIG. 1 is a layout of the first preferred embodiment of a photoelectrochemical particle(PEP) process for $H_2S$ decomposition for sulfur recovery.

FIG. 1 is a layout system 1 of a first preferred embodiment of using a photoelectrochemical particle(PEP) process for $H_2S$ decomposition for sulfur recovery. The first preferred embodiment is described in detail in reference to prior U.S. application Ser. No. 09/784,393 filed Feb. 15, 2001, which is a Divisional Application of Ser. No. 09/375,967 filed Aug. 17, 1999, now U.S. Pat. No. 6,248,218, which claims the benefit of priority of U.S. Provisional Application 60/126,036 filed on Mar. 25, 1999, by the same assignees, all of which are incorporated by reference.

The system 1 consists of three major units: A, the scrubber and filtration apparatus; B, an outgassing unit such as an $H_2S$ stripper, and the like; and C, the photoreactor. The scrubber used would be akin to a wet scrubber used in gas cleaning applications such as but not limited to the scrubber unit used in U.S. Pat. No. 5,211,923 to Harkness et al., which is incorporated by reference. Hydrogen sulfide $H_2S$, coming from a source 2 such as a hydrodesulfurization plant, a sour natural gas well and the like, is bubbled into scrubber 30 by line 5 where it encounters polysulfide solution 10 coming from photoreactor 70. An outlet 20 with control valve 25 is in place to maintain an overpressure of $H_2S$ in the head space and to function as a pressure relief valve. The $H_2S$ lowers the pH of the scrubber vessel solution 30, to approximately 7.0 to approximately 7.5, whereupon the polysulfide anion decomposes, freeing elemental sulfur, $S^0$. The sulfur is collected by filtration 40 of the suspension through a porous material such as ceramic frit, and the like. Other sources of producing hydrogen sulfide include but are not limited to an oil refinery, a gas refinery, a hydrodesulfurization plant, a sour natural gas well, a sewage treatment plant, and a kraft process paper mill, and the like.

The filtrate continues by line 45 into the stripper unit B, where the excess $H_2S$ is removed from the sulfide solution. The pH of the solution rises to the 10 to 12 range, depending on the extent of $H_2S$ removal. The $H_2S$ is returned through line 50 to the foreline of the scrubber unit A, while the sulfide solution 60 is fed to the photoreactor C containing immobilized photocatalyst. The sulfide solution inside the photoreactor 70, consisting mainly of bisulfide ion, $HS^-$, is oxidatively converted to elemental sulfur and then complexed with excess bisulfide ion to make polysulfide ion, $S_n^{2-}$, while water is reduced to make $H_2$, under the action of light source 80. The photocatalyst can be a platinized cadmium sulfide, Pt—CdS. See for example N. Buhler, et al., Photochemical Hydrogen Production with Cadmium Sulfide Suspensions, J. Phys. Chem., Vol. 88(1984) pp. 3261. Other photocatalysts such as zinc sulfide, ZnS, zinc ferrate, $ZnFe_2O_4$, indium sulfide, $In_2S_3$, and the like would also additionally have a photocatalytic effect on $H_2S$. See Ueno et al., Silica-Supported ZnS Cds Mixed Semiconductor Catalysts for Photogeneration of Hydrogen, J.Phys.Chem, 89(1985), pp. 3828; Li et al., Hydrogen Production by H2S Photocatalytic Decomposition, New J. Chem., 16(1992) pp. 517; and Savinov et al., Suspensions of Semiconductors With Microheterojunctions—A New Type of Highly Efficient Photocatalyst For Dihydrogen Production From Solution of Hydrogen Sulfide and Sulfide Ions, Int. J. Hydrogen Energy, 14(1989) pp. 1.

Any broadband visible light source such as a low pressure mercury fluorescent lamp or a tungsten filament bulb, would provide some excitation energy for the photocatalytic reaction. Light sources concentrating their irradiance between approximately 450 to approximately 500 nm would be most effective. This is due to the spectral window created by the absorption edge of the CdS photocatalyst on the low energy side and the absorption edge of the background polysulfide solution on the high energy side. Examples of such light sources would be Zn, and Cd spectral lamps and certain special blue fluorescent lamps.

Referring to FIG. 1, the $H_2$ gas percolates out the top of the photoreactor C, while the polysulfide solution is returned to the scrubber unit A. $H_2$ is released out of the top of the photoreactor, underneath "C". The sulfur is shown as being collected by filtration. Use of a settling tank would also be an alternative. Either way, the sulfur is a solid and would have to be collected by opening up the system. Additionally, the sulfur can be melted and collected in molten state.

It would be important to include excess base to keep pH high and facilitate photocatalytic reaction, since the photo-oxidation of $HS^-$ requires $OH^-$ as a co-reactant. As previously described a light source having maximum wavelength range of between approximately 450 to approximately 500 nm is needed to penetrate the disulfide solution while remaining within the spectral envelope of CdS. Use of a reasonably strong acid such as HCl, $H_2SO_4$, $H_3PO_4$ can be used to precipitate sulfur from polysulfide solution. From a material supply and cost point of view, it would be desirable to use $H_2S$(hydrogen sulfide) as the acidic agent.

Figure 2:
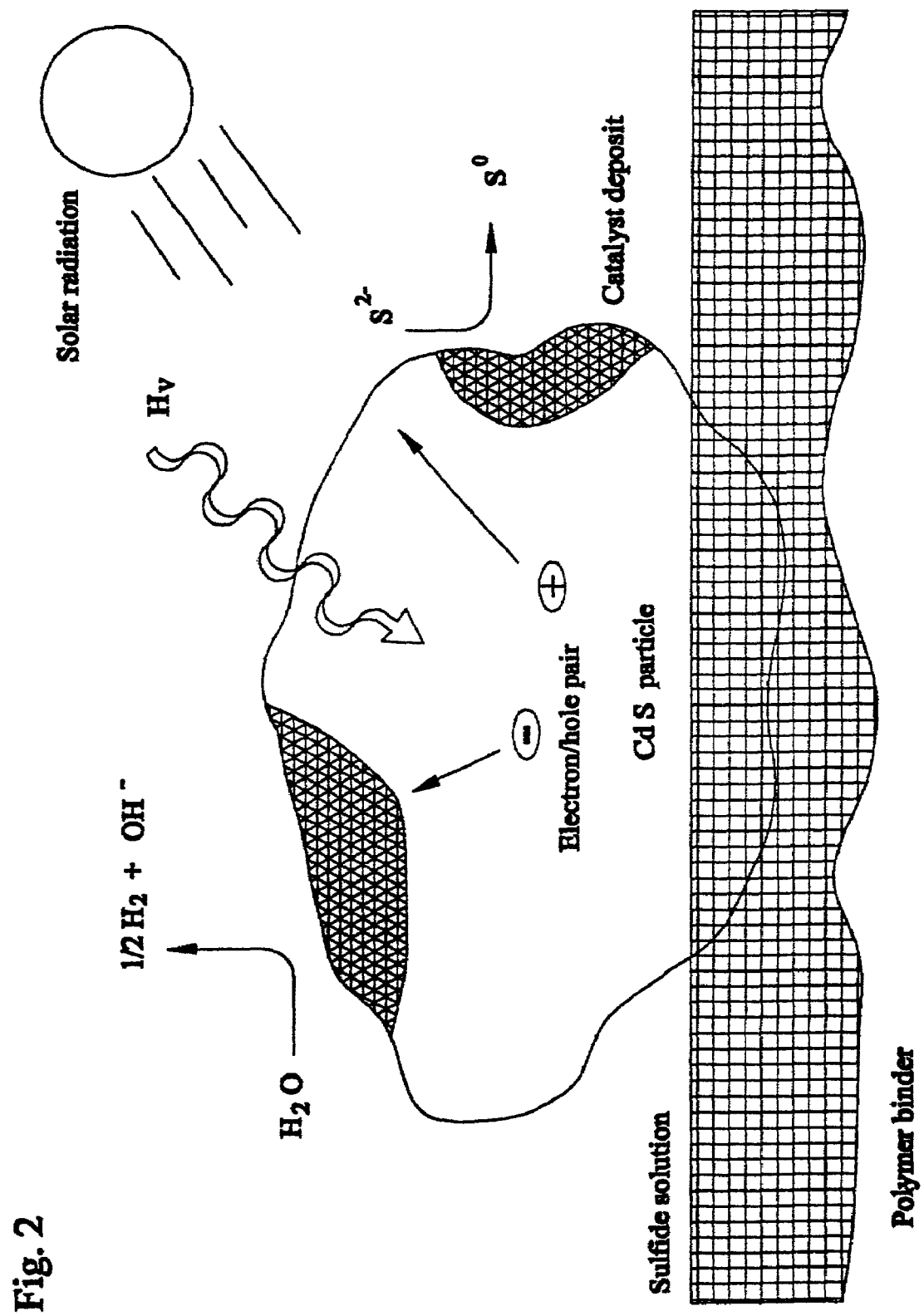
FIG. 2 shows how a semiconductor particle works for sulfur recovery.

FIG. 2 shows how a semiconductor particle works for sulfur recovery. FIG. 2 shows the operation of a photocatalytic particle as it would apply to hydrogen sulfide decomposition. The photoparticle is immobilized in a polymer binder and subjected to an ultraviolet(UV) visible radiation source such as sunlight, and the like. Absorption of a photon of light whose energy is greater than the band gap energy of the photocatalytic material results in the creation of an electron/hole pair. The pair represents positive and negative charge carriers that can move independently of each other. Both carriers can be capable of charge transfer into the surrounding solution. The free electron represents reducing, or electron-donating power, while the hole represents oxidizing, or electron accepting, power. Because of the small particle size(on the order of approximately 1 um) the charge carriers can quickly migrate to the particle/electrolyte interface. The electron serves to reduce water to $H_2$ gas and hydroxide ion, while the hole serves to oxidize sulfide or bisulfide ion, depending on the solution pH, to elemental sulfur.

Figure 3:
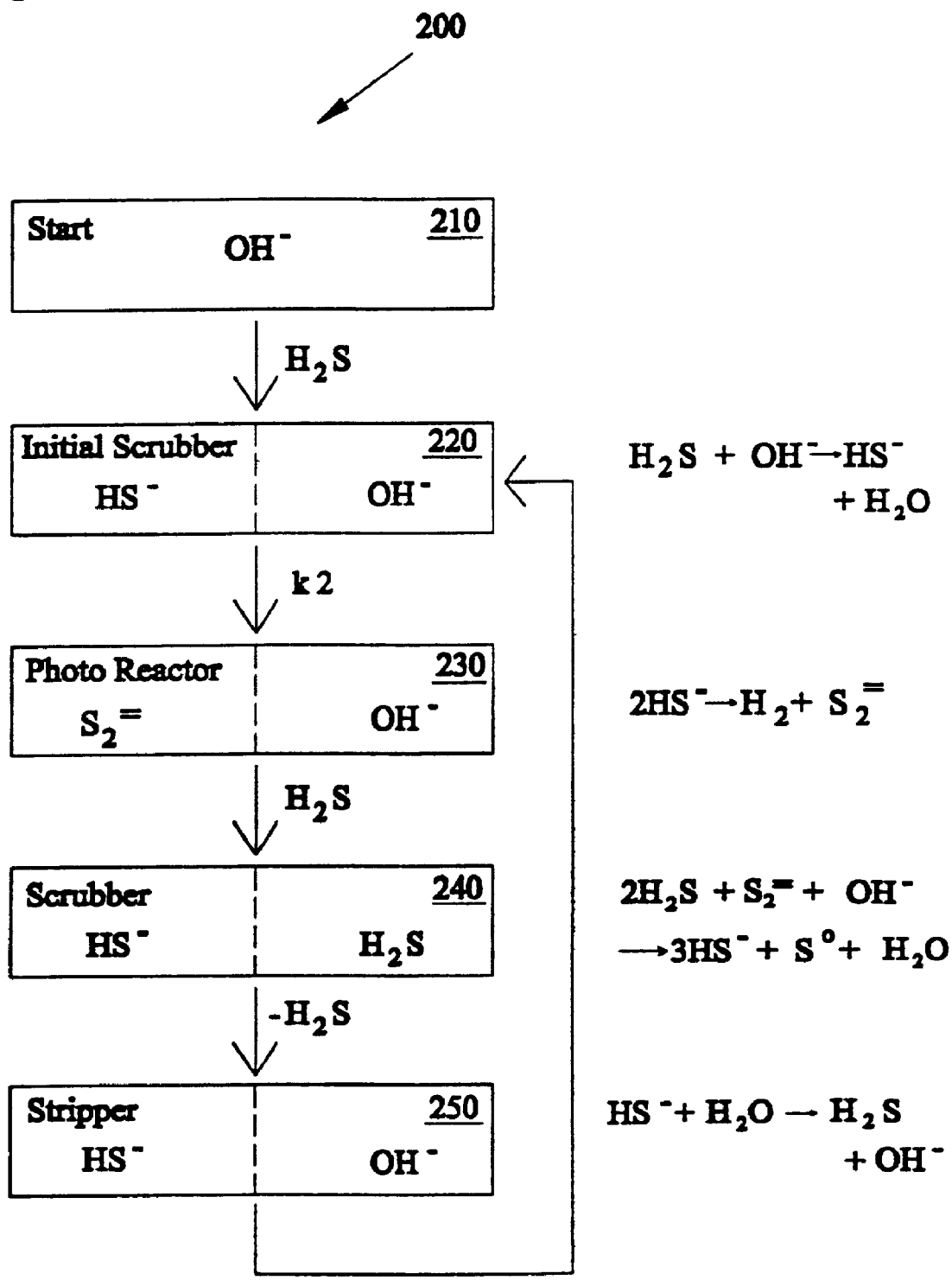
FIG. 3 is a flowchart of the chemical formula reaction occurring in the layout of FIG. 1.

FIG. 3 shows a flowchart of the chemical formula reactions occurring in the first preferred embodiment of FIG. 1. The process chemistry associated with each part of the PEP process is shown in FIG. 3. For the system start-up, the scrubber contains only caustic solution, representing some background $OH^-$ concentration (210). Hydrogen sulfide is introduced, generating $HS^-$ and eliminating half of the $OH^-$ ion (220)$H_2S$. This solution then goes to the photoreactor, where light absorption by the photocatalyst converts bisulfide ion to disulfide ion, $S_2^=$ (230). The resultant solution returns to the scrubber, where pressurization by $H_2S$ results in the reverse conversion plus the precipitation of elemental sulfur, $S°$ (240). Stripping away the excess $H_2S$ raises pH and regenerates the initial balance of bisulfide and hydroxide ion(250).

The first embodiment can use either or both sunlight and ultraviolet light.

Second Preferred Embodiment

In this embodiment, the final stage of the first preferred embodiment is eliminated, so that an ultraviolet source emitting at approximately 254 nm from a low-pressure mercury lamp illuminates the alkaline sulfide solution alone with no catalyst, instead of using a photocatalyst and a reactor that is subjected to a visible wavelength lamp at approximately 450 to approximately 500 nm. Lamp can be but is not limited to cadmium line emission lamp, a super actinic mercury lamp, and the like. Unlike the first embodiment, the second embodiment is limited to using artificially created ultraviolet radiation.

Other than not being able to use sunlight, the second preferred embodiment has most of the basic advantages of the first preferred embodiment and many additional advantages. For example, avoiding the use of a photocatalyst removes the cost requirement of having a photocatalyst. Thus, the second embodiment is less expensive than the first embodiment. Additionally, the lack of using a photocatalyst removes the difficulties in maintaining a mechanically stable, immobilized photocatalyst deposit. Additionally, the lack of using the photocatalyst removes any toxicity concerns that can come with using inorganic semiconductors such as CdS(cadium sulfide).

Another advantage of the second preferred embodiment is that using low pressure mercury lamps would be an inexpensive lamp source in terms of photons per dollar, in electrical efficiency and manufacturing costs.

Another advantage of the second embodiment is that the light-driven decomposition reaction is nearly pH independent, so that the need for a stripping unit to adjust pH between the scrubber vessel and the photoreactor can be obviated.

FIG. 4 is a layout of a second preferred embodiment 400 of a closed cycle process shown in the first preferred embodiment without a photocatalyst.

Major unit A of FIG. 4 can be a $H_2S$ scrubber/$S°$ precipitator similar to that described in the FIG. 1 layout above for the first preferred embodiment. The numerical descriptors for unit A are also the same as in FIG. 1. However, in the second embodiment, a stripping unit is no longer necessary, and so the only other major unit is the photoreactor B. The photoreactor B can consist of a low pressure mercury lamp 450 surrounded in a radial configuration by a double-walled vessel 460 through which the sulfide solution is pumped. While the inner wall of the photoreactor vessel 460 can be made of quartz to permit transmission of ultraviolet light, the outer wall can be made from any substance exhibiting corrosion resistance to aqueous sulfide solutions, such as borosilicate glass, alumina, various stainless steels, polypropylene, and graphite, and the like.

The outputs 470 from the photoreactor B can be the same as in the first embodiment. Namely, $H_2$ gas percolating out the top of the reactor, and disulfide ion being carried back to the scrubber/precipitator A.

The solution inside the photoreactor B consists mainly of bisulfide ion, $HS^-$(aq), along with lesser amounts of sulfide ion, $S^{2-}$(aq), disulfide ion $S_2^{2-}$(aq), and dissolved hydrogen sulfide gas, $H_2S$(aq). All of the above species can be capable of absorbing the approximately 254 nm radiation of a low pressure mercury lamp.

Here, the hydrogen sulfide solution in a reactor vessel 460 is subject to ultraviolet(UV) radiation being emitted by UV source 450, which can be a low pressure mercury lamp, and the like. Lamp 450 can be for example the Ster-L-Ray brand germicidal lamp by Atlantic Ultraviolet Corporation. The UV radiation can have a wavelength of approximately 254 nm. Low pressure mercury type lamps are commonly rated to last up to approximately 10,000 hours.

While nearly all of the light emission occurs at approximately 254 nm, lesser lines can be emitted at approximately 313, approximately 365, approximately 405, approximately 436, and approximately 546 nm.

The subject inventors have shown that UV photolysis of sulfide solution results in stoichiometric production of molecular hydrogen and disulfide ions, from which sulfur can be derived:

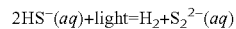

$$2HS^-(aq) + light = H_2 + S_2^{2-}(aq)$$

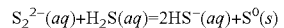

$$S_2^{2-}(aq) + H_2S(aq) = 2HS^-(aq) + S^0(s)$$

The bisulfide ion inside the photoreactor B absorbs ultraviolet light in the presence of water and decomposes, rearranging to make disulfide ion and hydrogen gas. Once inside the scrubber, disulfide ion is acted on by $H_2S$ to release and precipitate the elemental sulfur, while more bisulfide ion is consequently generated.

FIG. 5 is a flowchart 500 of the chemical formula reaction occurring in the layout of FIG. 4. This flowchart 500 depicts the various steps 510, 520, 530, 540 in the photodecomposition of $H_2S$ to release and precipitate the elemental sulfur, while more bisulfide ion is consequently generated. The system can be brought up initially by the scrubbing of gaseous $H_2S$ by an alkaline solution in step 510. The scrubbing reaction can convert the $H_2S$ gas into a mixture of dissolved gas and solvated bisulfide ion. This solution can be pumped through the photoreactor, step 520, where absorption of ultraviolet light can effect the decomposition of the dissolved sulfur species to form $H_2$ gas and disulfide ion. The disulfide ion solution can then return to the scrubber, step 530, where additional $H_2S$ reacts with it, freeing the elemental sulfur and generating bisulfide ion. This solution can then be passed through a filter type step, step 540, or other type os solid phase separator, which collects the sulfur and allowing the bisulfide ion solution to pass through on its return to the photoreactor, step 520, and so forth as shown in the flowchart 500.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of recovering sulfur from hydrogen sulfide ($H_2S$) waste streams using a photochemical process in a closed cycle system without photocatalysts, comprising the steps of:
   (a) producing a bisulfide solution from hydrogen sulfide ($H_2S$) and an alkaline solution;
   (b) applying an ultraviolet (UV) light having a wavelength of approximately 254 nm directly to the bisulfide solution to separate said bisulfide solution into hydrogen and disulfide solution without a catalyst;
   (c) introducing the disulfide solution to additional hydrogen sulfide to separate sulfur and regenerate the separated bisulfide solution;
   (d) collecting the sulfur; and
   (e) recycling steps (b), (c) and (d), so that the separated bisulfide solution can be recycled in a closed cycle system.

2. The method of recovering sulfur of claim 1, wherein step(a) further includes:
   producing the hydrogen sulfide from a source chosen from at least one of:
   an oil refinery, a gas refinery, a hydrodesulfurization plant, a sour natural gas well, a sewage treatment plant, and a kraft process paper mill.

3. The method of recovering sulfur of claim 1, wherein step (b) further includes:
   applying the light from a low pressure mercury lamp.

4. A method of decomposing hydrogen sulfide($H_2S$) to sulfur(S) and hydrogen($H_2$), comprising the steps of:
   (a) producing a first sulfide solution;
   (b) applying an ultraviolet light having a wavelength of approximately 254 nm directly to the first sulfide solution without a catalyst to separate hydrogen and form a second sulfide solution; and
   (c) recycling the second sulfide solution to separate sulfur and generate a next first sulfide solution.

5. The method of claim 4, wherein step (b) further includes:
   applying the light from a low pressure mercury lamp.

6. The method of claim 4, wherein step (c) includes:
   mixing the recycled second solution with hydrogen sulfide to separate the sulfur and generate the next first sulfide solution; and
   collecting the sulfur; and
   repeating steps (b) and (c).

7. A system for recovering sulfur from hydrogen sulfide ($H_2S$) waste streams using a photochemical process, comprising:
   means for producing hydrogen sulfide gas;
   means for scrubbing the hydrogen sulfide gas with an alkaline solution to produce a bisulfide solution;
   means for directly applying ultraviolet light having a wavelength of approximately 254 nm without a catalyst to the bisulfide solution to separate the bisulfide solution into hydrogen gas and a disulfide solution; and
   means for returning the disulfide solution to the scrubbing means where the disulfide solution reacts with hydrogen sulfide gas to separate sulfur and to regenerate the bisulfide solution.

8. The system for recovering sulfur of claim 7, wherein the means for producing hydrogen sulfide gas is chosen from at least one of:
   an oil refinery, a gas refinery, a hydrodesulfurization plant, a sour natural gas well, a sewage treatment plant, and a kraft process paper mill.

9. The system for recovering sulfur of claim 7, further comprising:
   means for collecting the sulfur.

10. The system for recovering sulfur of claim 7, wherein the means for applying ultraviolet light includes:
    a low pressure mercury lamp.

11. The system for recovering sulfur of claim 7, further comprising:
    means for recycling the sulfur.

* * * * *